(12) United States Patent
Kotsaridou et al.

(10) Patent No.: US 7,247,239 B2
(45) Date of Patent: Jul. 24, 2007

(54) METHOD FOR BIOLOGICAL TREATMENT OF WATER BY ADDING MACROMOLECULAR CARBOHYDRATES

(75) Inventors: Maria Kotsaridou, Osterode (DE); Alfons Vogelpohl, Clausthal-Zellerfeld (DE); Hasan Hamouda, Clausthal-Zellerfeld (DE)

(73) Assignee: Technocon GmbH, Clausthal-Zellerfeld (DE)

( * ) Notice: Subject to any disclaimer, the term of this patent is extended or adjusted under 35 U.S.C. 154(b) by 0 days.

(21) Appl. No.: 10/495,368

(22) PCT Filed: Nov. 15, 2002

(86) PCT No.: PCT/DE02/04239

§ 371 (c)(1),
(2), (4) Date: Nov. 4, 2004

(87) PCT Pub. No.: WO03/045847

PCT Pub. Date: Jun. 5, 2003

(65) Prior Publication Data

US 2005/0155929 A1    Jul. 21, 2005

(30) Foreign Application Priority Data

Nov. 16, 2001    (DE) ................................ 101 56 528

(51) Int. Cl.
*C02F 3/00* (2006.01)
(52) U.S. Cl. ....................................... 210/610; 210/611
(58) Field of Classification Search ......... 210/610–611
See application file for complete search history.

(56) References Cited

U.S. PATENT DOCUMENTS 3,404,142 A * 10/1968 Shank et al. ................. 530/421
3,591,410 A * 7/1971 Ross ........................... 427/140
4,749,494 A   6/1988 Tomoyasu et al.
5,034,137 A   7/1991 Okamoto ..................... 210/725
6,153,582 A * 11/2000 Skelnik ........................ 514/12
6,297,033 B1  10/2001 Van Rijn et al.
2002/0195389 A1* 12/2002 Perriello ...................... 210/610
2003/0155296 A1*  8/2003 Boyd et al. .................. 210/610
2004/0144718 A1*  7/2004 Rick ............................ 210/605

FOREIGN PATENT DOCUMENTS

| DE | 40 28 312 | 9/1990 |
| DE | 195 42 146 | 5/1997 |
| EP | 0 659 695 | 6/1995 |

(Continued)

OTHER PUBLICATIONS

Sawyer, C.N., "Chemistry For Sanitary Engineers," 1967, McGraw-Hill, p. 399-400.*

(Continued)

*Primary Examiner*—Chester T. Barry
(74) *Attorney, Agent, or Firm*—Whitham, Curtis, Christofferson & Cook, PC

(57) ABSTRACT

The invention relates to a method for biological treatment of water, wherein macromolecular carbohydrates are added to the water to be treated, optionally together with vitamins and other additives, whereby a great reduction in residues is already achieved after adding small amounts of macromolecular carbohydrates, for example 0.4 to 600 mg/kg $BSB_{5,zw}$ or 0.014 to 14 mg/kg dry activated sludge daily.

20 Claims, 4 Drawing Sheets

Figure 1:
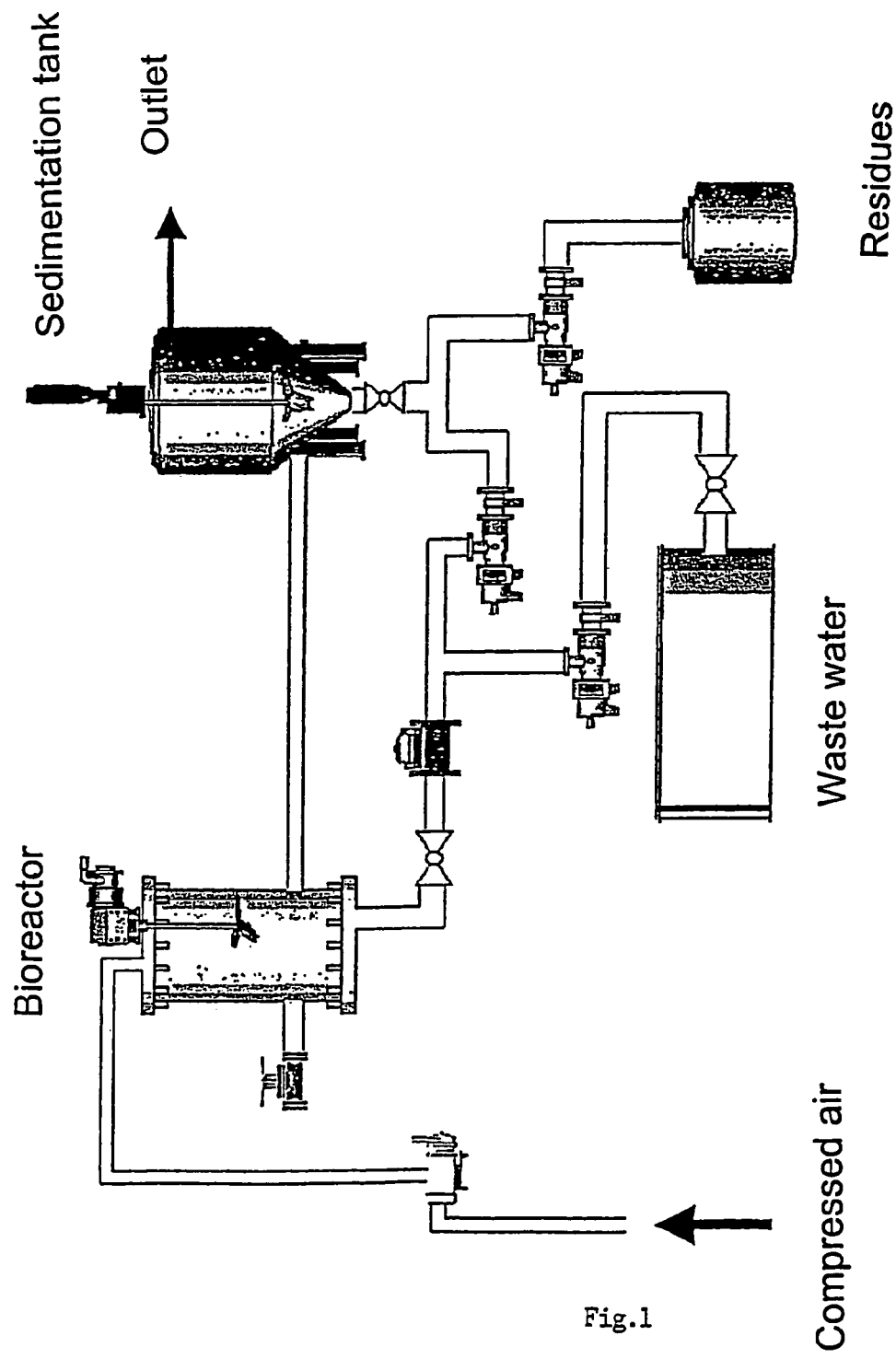

Flow chart of the Technology College system

FOREIGN PATENT DOCUMENTS

JP          04040287          2/1992

OTHER PUBLICATIONS

Berlin et al. Article titled: "Biologishe Zusatztoffe in der Abwasserreinigung . Bakterien-Enzyme-Vitamine-Algenpraparate" dated Jul. 1990; No. 7 pp. 793-799.

W.H. Rulkens et al. "The potential for metazoa in biological wastewater treatment" WQI Sep./Oct. 1998, Sludge Management; pp. 25-27.

Lee et al. "Reducing sludge production in aerobic wastewater treatment through manipulation of the ecosystem"Wat. Res. vol. 30 No. 8 pp. 1781-1790; 1996.

Low et al. "Uncoupling of metabolism to reduce biomass production in the activated sludge process"War. Res.; vol. 34 No. 12 pp. 3204-3212 dated 2000.

Low et al. "Reducing production of excess biomass during wastewater treatment";Wat. Res. vol. 33, No. 5 pp. 1119-1132.

Strand et al. "Activated-sludge yield reduction using chemical uncouplers" Water Enviroment Research, vol. 71 No. 4 pp. 454-458 dated Jul./Aug. 1999.

B. Abbassi et al. "Minimization of excess sludge production by increase of oxygen concentration in activated sludge floes; experimental and theoretical approach" Wat. Res.; vol. 34, No. 1 pp. 139-146 dated 2000.

Eberhard Schadlich, "Homoopathische Wirkstoffdosen erhohen die Belebtschlammakitivitat beim Phosphatabbau" WLB Wasser/Abwassertechnik pp. 30-31; 1995.

Heike Hoffman et al. "Untersuchung zum Einsatz selektierter Bakterien zur Reduzierung der UberschuBschlammproduktion" Korresponding Abwasser, 44 No. 12 pp. 2205-2212 1997.

Sarfet F. Berlin et al, "Buiologische Zusatztoffe in der Abwasserreinigung Bakterian -Enzyme-Vitamine-Algenpraparate" Korresponding Abwasser, pp. 793-799; 1990.

Staab et al. 1st eine biologische Abwasserreinigung ohne UberschuBschlammanfall moglich? dated Apr. 1997 pp. 44-49-WAP; Schlammanfall; pp. 44-49 1999.

Hans Joachim Schmitz, Geruchsverminderung bei Weinbauabwessern; WLB Wasser/Abwassertechnik pp. 41-42 1999.

Hans Joachim Schmitz, "Aktivierende cSubstanzev helfen alten und neuen Klarwerken" WLB Wasser/Abwassertechnik pp. 37-38; 2000.

* cited by examiner

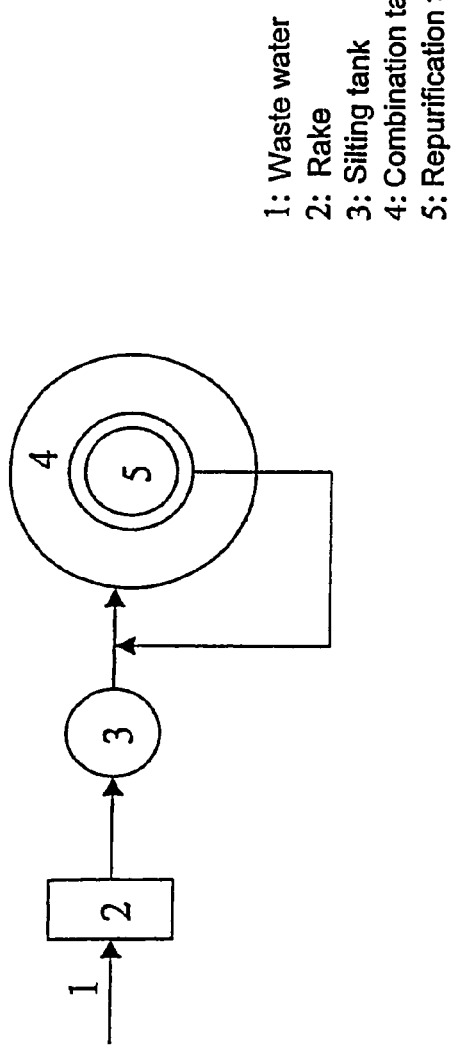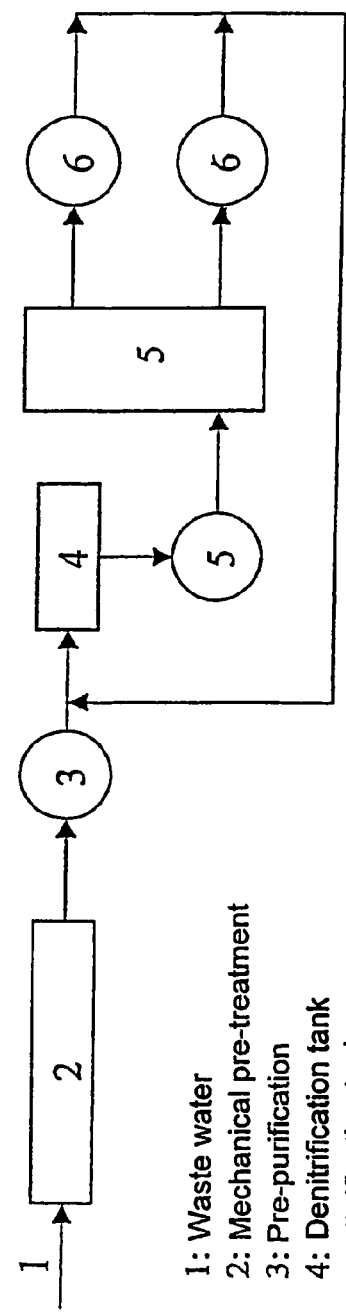

METHOD FOR BIOLOGICAL TREATMENT OF WATER BY ADDING MACROMOLECULAR CARBOHYDRATES

The invention relates to a method for biological treatment of water, and to a water treatment agent that is applied to biological water treatment systems in small amounts, with the objective of reducing the residue quantities obtained.

Biological methods are used for treating domestic and industrial waters. In the biological conversion of dissolved and undissolved ingredients, new micro-organisms are formed, with which solids with poor biodegradability properties contained in the waters are separated off and then removed from the treatment systems. These residues are reused in agriculture or in recultivation, depending on the harmful substances contained therein and the concentration thereof. Furthermore, heat treatment and landfill as well as reuse/disposal are performed using special methods. Agricultural reuse can be carried out immediately or after pretreatment. Most disposal/reuse methods require pre-treatment of the residues. This generally consists of the following procedural steps: rotting, thickening and dehydration with conditioning, whereby a solid concentration of 20% to 40% is attained. Drying methods are used to reduce the water content further. This reduces the storage space requirement and enables the dried residues to be used as fuel in thermal systems. The costs increase significantly the more the water content is reduced. The specific costs for residue disposal/reuse range between DM 400 and DM 1500 per tonne of dry substance (Geißen, S.-U, A. Vogelpohl, GVC—Symposium Abfall—Wirtscheft Herausforderung und Chancen (The Waste Industry—Challenge and Opportunities) 17-19 Oct. 1994, Würzburg) and will increase further in future. For this reason, it is of particular interest to reduce the generated residue quantity as much as possible.

EP 0 659 695 describes a process in which the sludge is mixed with biodegradable tensides, which are intended to lead to lysis of the micro-organisms and a 50% dry substance reduction. Up to 200 mg of tenside per kilogram of dry substance must be added. The method has not yet entered into widespread practical use.

DE 195 42 146 describes a method in which the residue production is intended to be lower than in the conventional method. This objective is fulfilled by diverting part of the residual sludge and aerating it. The reduction is attained through stabilisation of the activated sludge and the associated increase of the sludge age. i.e. the dwell time of the activated sludge in the system. This procedure requires an additional tank volume and increased oxygen input.

U.S. Pat. No. 4,749,494 describes a method for waste water treatment that consists of an activation tank, a stabilisation tank and an ultrafiltration membrane. The purified water is drawn off as filtrate and the concentrate is fed back into the stabilisation stage. The return from the stabilisation stage to the activation tank results in a sufficient activated sludge concentration there. The use of membrane filtration enables a very high activated sludge concentration and therefore a low activated Sludge load level, thus reducing the residue production. However, the cost of membrane filtration are very high. In addition, the high activated sludge concentration and the continuing mineralisation of the activated sludge incurs further costs for oxygen input.

The literature also refers to the reduction of the sludge load by using membrane filtration and the associated reduction of residue production (Staab K. F., Wasser Abwasser Praxis (*Water/Waste Water Practice*) (1997) 4, pp. 44-49). A further reduction can be achieved by increasing the oxygen partial pressure. However, to do this, the system must be supplied with oxygen (Abbassi B., S. Dullstein, N. Räbiger, Water Research 34 (2000) 1, pp. 139-146) or the operating pressure must be increased (Staab K. F. Wasser Abwasser Praxis (*Water/Waste Water Practice*) (1997) 4, pp. 44-49). Both result in further mineralisation and increase the costs significantly.

In a general article (Korrespondenz Abwasser (*Waste Water Correspondence*) 37 (1990) 7, pp. 793-799), bacteria, enzymes, vitamins and algae preparations are critically assessed as additives in waste water purification. No effects that lead to a reduction of residue production are described. Hoffmann H. and J. Tränckner (Korrespondenz Abwasser (*Waste Water Correspondence*) 44 (1997) 12, pp. 2205-2212) have examined the continuous addition of bacteria to break down high-molecular carbon compounds with simultaneous reduction of residue production. Effects could not be determined.

Furthermore, a tenside-based product for reducing residue production is known that has a similar means of action to that described in EP 0 659 695 (Schmitz, H. J., WLB (1999) 11-12, pp. 41-42: Schmitz, H. J., WLB (2000) 6, pp. 37-38). In addition to the lack of clearly demonstrated effect, high costs are incurred.

Rulkens, W. H., J. H. Rensink, H. F. van der Roest (WQI (1998) September/October, pp. 25-27) and Lee, N. M., T. Welander, Reducing, (Water Research 30 (1998) 8. pp. 1781-1790) describe the possibility of reducing residue production by means of higher organisms. They favour the use of individual bacteria, which only occur in water treatment in sufficient quantities by means of process-related changes. As these changes are highly cost-intensive, the higher organisms react very sensitively to changed environmental conditions and the oxygen input must be increased significantly, this method has not entered into widespread practical use.

Schadlich E. (WLB (1998) 11-12, pp. 30-31) has determined an increase in biological phosphate elimination through the addition of homeopathic quantities of phosphorus. This could eliminate the addition of precipitant chemicals for phosphate elimination. As the precipitant sludge is only a small part of the total residue quantity, the effects would be very limited in technical application.

A microbiological method of reducing residue production is the decoupling of the anabolism (biomass structure) and the catabolism (substrate structure) through the addition of chemicals such as trichlorophenol, chloronitrophenol and paranitrophenol (Strand, S. E., G. H. Harem, H. D. Stensel, Water Environment Research 71 (1999) 4, pp. 454-458 and Low, E. W., H. A. Chase, M. G. Milner, T. P. Curtis, Water Research 34 (2000) 12, pp. 3201-3212). The results show reduced residue production, but technical application is not possible due to the toxicity and detrimental environmental effect of these substances.

A summary overview of the above-mentioned possibilities for reducing residue production can be found in Low, E. W., H. A. Chase, Water Research 33 (1999) 5, pp. 1119-1132.

All the methods described result in an increased oxygen input/energy requirement and, with the exception of enzymes, are unable to reduce the solids contained in water that make up a large proportion of the total residues.

The invention is based on the task of reducing the residues generated in biological water treatment systems in an economic and environmentally neutral manner.

This task is solved by means of a method of water preparation characterized in that macromolecular carbohydrates at a quantity of 0.04 to 600 mg/kg $BOD_{5,Feed}$ preferably 0.4 to 600 mg/kg $BOD_{5,Feed}$ more preferably 4 to 200 mg/kg $BOD_{5,Feed}$ (biological oxygen requirement in 5 days that is fed into the system) or 0.0014 to 14 mg/kg of dry activated sludge per day, preferably 0.014 to 14 mg/kg of dry activated sludge per day, more preferably 0.14 to 5 mg/kg of dry activated sludge per day, is added to the water prior to treatment or during treatment in a biological water treatment system, which, for example, operates according to the flow, activated sludge, contact aerator, fixed bed, filter or fluidized bed method.

In a variant according to the invention, the method is characterized in that macromolecular carbohydrates and vitamins at a quantity of 0.04 to 600 mg of macromolecular carbohydrates/kg $BOD_{5,Feed}$ plus 0.00046 to 6.9 mg of vitamins/kg $BOD_{5,Feed}$ preferably 0.4 to 600 mg of macromolecular carbohydrates/kg of $BOD_{5,Feed}$ plus 0.0046 to 6.9 mg of vitamins/kg of $BOD_{5,Feed}$ more preferably 4 to 200 mg of macromolecular carbohydrates/kg of $BOD_{5,Feed}$ plus 0.00046 to 2.3 mg of vitamins/kg of $BOD_{5,Feed}$ or 0.0014 to 14 mg of macromolecular carbohydrates/kg of dry activated sludge per day plus 0.000016 to 0.16 mg of vitamins/kg of dry activated sludge per day, preferably 0.014 to 14 mg of macromolecular carbohydrates/kg of dry activated sludge per day plus 0.00016 to 0.16 mg of vitamins/kg of dry activated sludge per day, more preferably 0.14 to 5 mg macromolecular carbohydrates/kg of dry activated sludge per day plus 0.0016 to 0.06 mg of vitamins/kg of dry activated sludge per day are added to the water to be treated or to the system.

The object of the invention is also a water treatment agent, containing macromolecular carbohydrates or macromolecular carbohydrates and vitamins in solid, liquid, dissolved or dispersed form, preferably in the form of an aqueous solution or dispersion.

The object of the invention is also the use of the water treatment agent for water treatment in a water treatment system. Water treatment system is defined as all devices with which biological water treatments can be carried out. This particularly includes waste water purification and treatment systems.

Sodium alginate can be preferably used as a macromolecular carbohydrate. Preferably, a sodium alginate can be used that, for example, is extracted from the brown alga "Macrocystis pyrifera" and has a molecular weight $M_w$, from 40,000 to 120,000. In particular 80,000 to 120,000. These preferably used alginates are linear polymers with mannosyluronic acid and gulosyluronic acid residues. The ratio of mannuronic acid to gulonic acid is, for example, approximately 60:40.

However, other sodium alginates and other macromolecular carbohydrates, such as starch, dextran, carrageenan, pectin, gum arabic, agar, xanthan and the derivatives of these substances, preferably with corresponding molecular weights over $M_w=40,000$, more preferably below 200,000, can also be considered. The aforementioned substances can be used as individual substances or as a mixture of two or more of these substances.

Preferably, biotin, thiamine hydrochloride, pyridoxine hydrochloride, aminobenzoic acid or mixtures of these substances are used.

Furthermore, in addition to the aforementioned substances, electrolyte salts, polyvalent alcohols, salts of organic acids, low-molecular aminocarbon acids, macropeptides and aromas or mixtures of these substances can be added to the water to be treated.

In this process, inorganic metal salts of the $1^{st}$ main group of the periodic system, in particular chlorides, can preferably be used as electrolyte salts, glycine as low-molecular aminocarbon acids, trisodium citrate dihydrate as salts of organic acids, sorbite-mannite mixtures as polyvalent alcohols, bovine serum albumin as macropeptides and pineapple aroma as aroma—mixtures of these substances can also be used.

The aforementioned substances or mixtures can be used in solid, liquid, dissolved or dispersed form, preferably as an aqueous solution or dispersion.

Such a preferably used solution or dispersion can, for example, contain 1 to 100 g/l, preferably 5 to 30 g/l of the aforementioned macromolecular carbohydrates.

For instance, it is possible that a solution or dispersion containing 0.002 to 20 g/l, preferably 0.02 to 2 g/l, of vitamins in addition to the described macromolecular carbohydrates is used.

Furthermore, it is possible that a solution or dispersion containing electrolyte salts, polyvalent alcohols, salts of organic acids, low-molecular aminocarbon acids, macropeptides and aromas or mixtures of these substances at a concentration of 0.1 to 500 g/l, preferably 1 to 50 g/l, in addition to the macromolecular carbohydrates and vitamins, is used.

Use of the described substances with the stated concentrations and compositions generates a reduction of residue production in biological water treatment systems that is surprising in view of the relatively low concentration of the water treatment agent used in terms of the volume of the water to be treated.

The addition of small amounts of the substances according to the invention can reduce residue production in biological systems by at least 20% and up to 80% without further practical, economic or environmental disadvantages.

The effects according to the invention can be disadvantageously influenced by manganese ions. High concentrations of manganese in particular should therefore be avoided.

The effect of reducing residue production is attained particularly well if the sludge dwell time in the overall system (activation end repurification) is sufficiently long. In terms or the entire dry substance mass, it is preferred if the dwell time is 30 to 300 days, preferably more than 100 days. Preferably, during the start-up process, no sludge should be extracted, in order to theoretically achieve an infinite dwell time and therefore faster adaptation of the activated sludge. Preferably after approx. 2 to 8 weeks a particularly good reduction of residue production can be achieved and sludge can again be continuously or discontinuously removed without the dwell time falling below the aforementioned values. The sludge dwell time can be extended by increasing the dry substance concentration in the activation process, by increasing the sludge pile level in the sedimentation process or by using a separate container/tank that is installed in the sludge circuit. The installation of a container/tank is also possible as an extension measure for systems in which the two variants first mentioned cannot be implemented due to the small construction volumes. This naturally also applies to the new construction of systems.

The effect of the substances is illustrated using the following examples with a sodium alginate and the water treatment agent according to table 1.

EXAMPLE OF A COMPOSITION OF THE WATER TREATMENT AGENT

TABLE 1

| Substance group | Active substance (S) or additive (A) | Individual substance | Concentration in g/l |
|---|---|---|---|
| Electrolyte salts | A | Sodium chloride (NaCl) | 2 |
| | | Potassium chloride (KCl) | 2 |
| Low-molecular aminocarbon acid | A | Glycine ($C_2H_5NO_2$) | 5 |
| Polyvalent alcohols | A | Sorbite-mannite mixture ($C_6H_{14}O_6$) | 1 |
| Salts of organic acids | A | Trisodium citrate dihydrate ($C_6H_5Na_3O_7 2H_2O$) | 4 |
| Macropeptides | A | Bovine serum albumin | 0.01 |
| Aromas | A | Pineapple aroma | 0.25 |
| Vitamins | A | 1) Biotin ($C_{10}H_{16}N_2O_3S$) | 1) 0.01 |
| | | 2) Thiamine hydrochloride ($C_{12}H_{16}Cl_2N_4OS$ x$H_2O$) | 2) 0.1 |
| | | 3) Pyridoxine hydrochloride ($C_8H_{11}NO_3$—HCl) | 3) 0.02 |
| | | 4) Aminobenzoic acid ($C_7H_7NO_2$) | 4) 0.1 |
| Macromolecular carbohydrates | W | Sodium alginate (($C_6H_7O_6Na)_n$) | 20 |

All substances dissolved in water

The aqueous mixture stated in table 1 is preferably added to the systems in small amounts, diluted with water (1:2 to 1:10).

The doses stated in the examples below relate to the mixture stated in the table, unless otherwise described.

Test System

Figure 2:
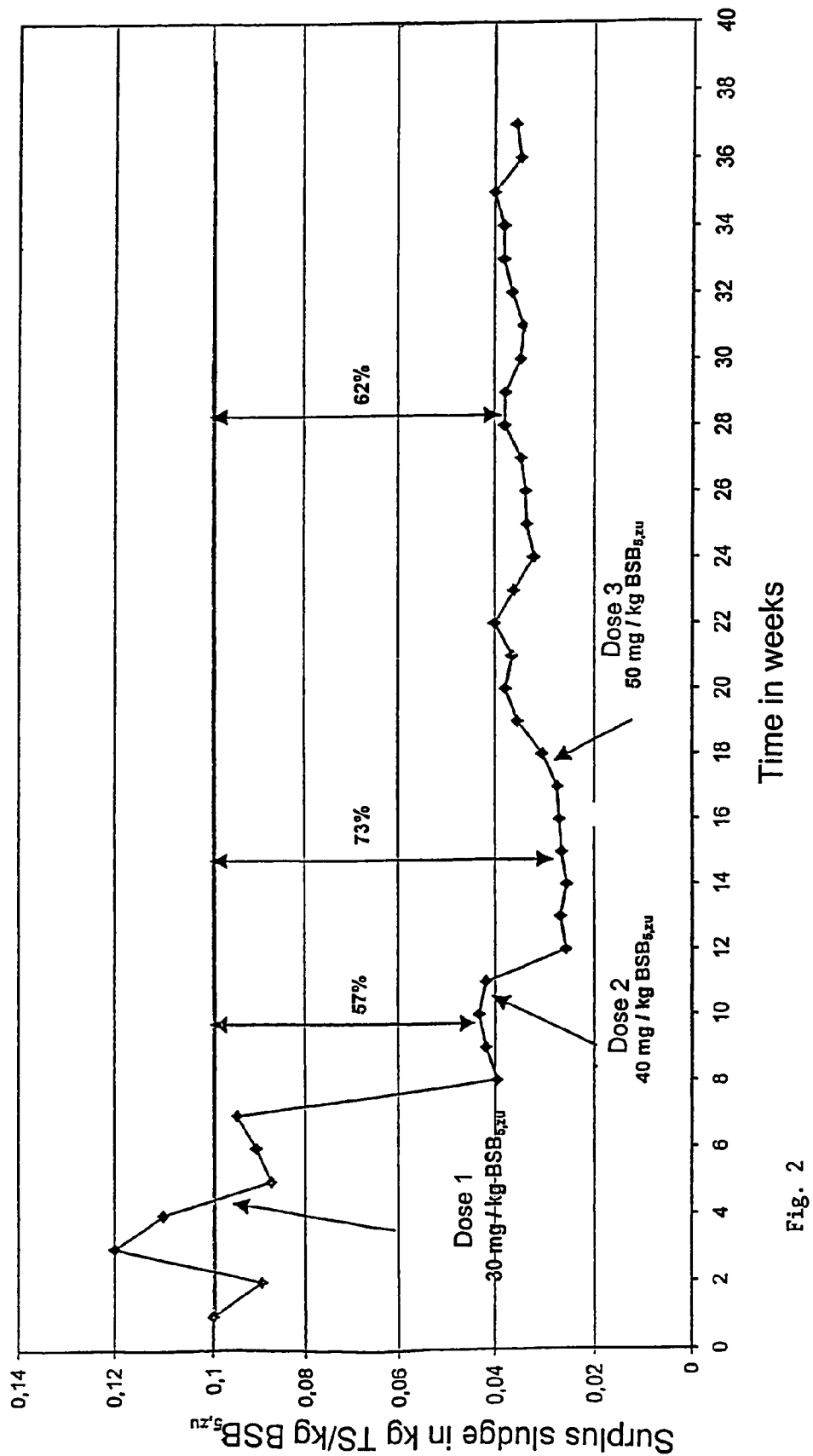

The activated sludge system shown in FIG. 1 consists of a waste water tank 1, a 200 l gas-injection reactor 2 as well as a sedimentation tank 3, in which the activated sludge is separated off. The separated activated sludge is fed back into the reactor 2 using a pump. A small proportion is removed as residue 4. As the quantity of residue produced predominantly depends on the decomposed load the residue quantity produced relates to this. FIG. 2 shows the specific residue production of the system with constant process-related adjustments as a function of the time for different doses of the sodium alginate. Without the additive, a specific residue quantity of 0.1 dry substance per kg of eliminated $BSB_5$ (biological oxygen requirement in 5 days) is determined. Four weeks after the start or addition of 30 mg per kg of $BSB_{5,zw}$ ($BSB_{5,zw}$ fed into the system), a constant and almost 60% reduction of residue production was determined. As a result of a further increase of the addition to 40 mg per kg of $BSB_5$, the reduction was increased to over 70%. After five weeks, addition of 50 mg per kg of $BSB_{5,zw}$ was carried out, although it led to no further reduction of residue production. In the investigation period of 37 weeks shown in FIG. 2, the effect of the substance mixture was clearly demonstrated under reproducible conditions.

Biological Treatment System 1

The load of approx. 8000 inhabitant units (1 inhabitant unit=60 g of $BSB_5$ per d) is treated in the biological treatment system according to FIG. 3. After the rake 2 and the silting tank 3, the waste water 1 is fed into the combination tank 4, in which intermittent nitrification/denitrification is performed. Next, the activated sludge is separated off, followed by the return to the combination tank 4. As the residue is agriculturally reused and appropriate verification is required, a precise determination of the quantity generated is possible.

Table 2 clearly shows that adding small amounts of the substance mixture achieved a significant reduction of residue production. Without addition, approx. 100 t of dry substance per year was generated, which equates to specific production of 0.8 kg of dry substance per kg of decomposed $BSB_5$ and is also known from other systems. Adding the substance mixture reduced residue production to 41 tonnes per year or 0.25 kg of dry substance per kg of decomposed $BSB_5$. With these results, the action of the substance mixture over a period of 4 years is documented, with due consideration of the effects of the weather.

TABLE 2

Residue production of biological treatment system 1

| Year | Decomposed load in kg $BSB_5^{d-2}$ | Residue production in t TS $a^{-1}$ | Spec. residue production in kg TS (kg $BSB_{5,zw})^{-1}$ | Product addition in ml (kg $BSB_{5,zw})^{-2}$ |
|---|---|---|---|---|
| 1. (1997) | 450 | 100 | 0.61 | None |
| 2. (1998) | 422 | 56 | 0.36 | 1.2 |
| 3. (1999) | 360 | 65 | 0.50 | 0.7 |
| 4. (2000) | 450 | 41 | 0.25 | 2.2 |

Biological Treatment System 2

Figure 5:
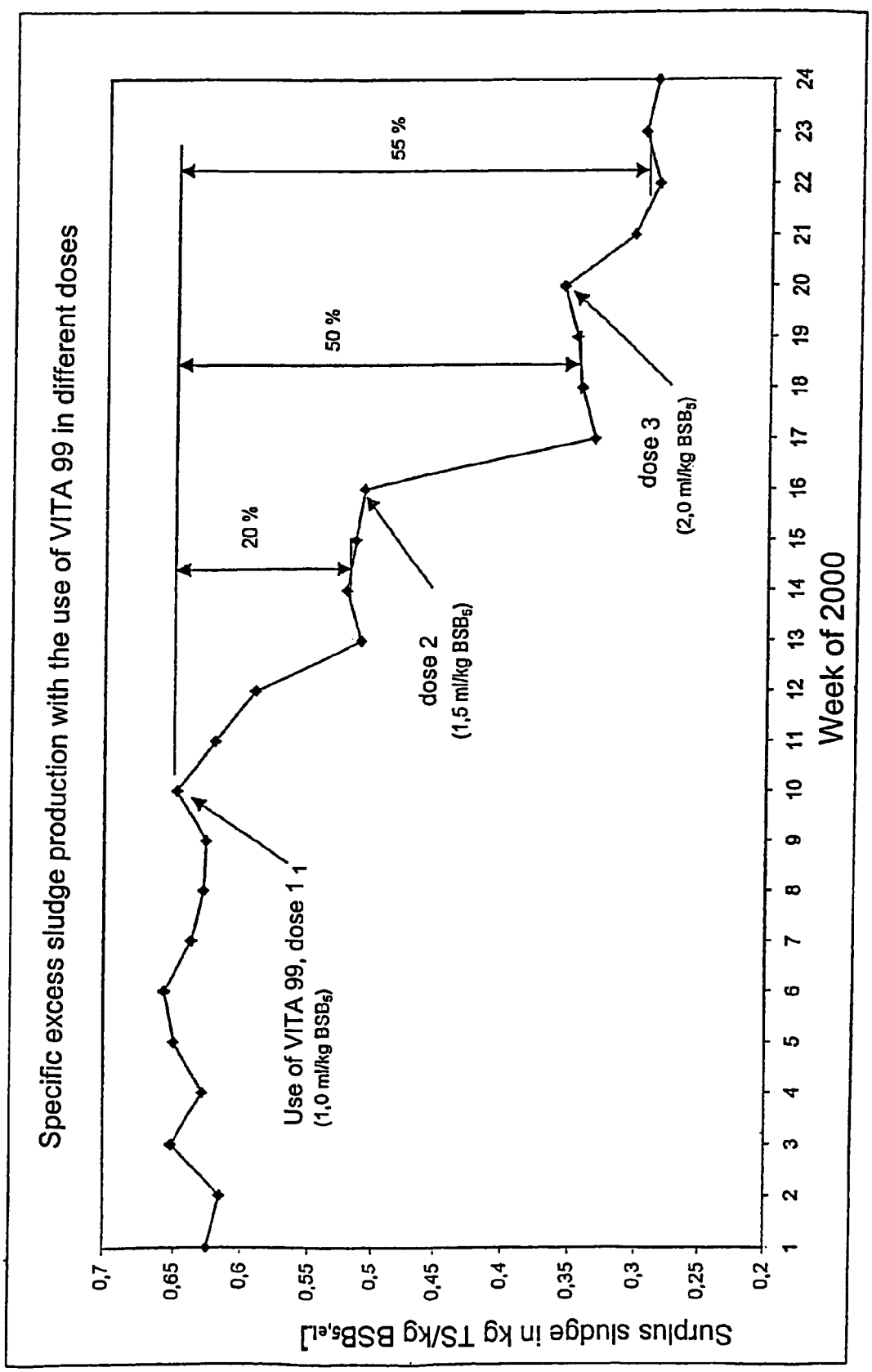

Biological treatment system 2 (FIG. 4) has a structure size of approx. 40,000 inhabitant units (IU) and is equipped for maximum nitrification and denitrification. After mechanical pretreatment 2, the water to be treated 1 is cleaned in a pre-purification 3 of particular substances before it enters the biological stage. This consists of an upstream denitrification process 4, a notification process 5 and a sedimentation stage 6. The specific residue production is set out as a function of the investigation period in FIG. 5. The addition in small quantities of the water treatment agent in accordance with table 1 was varied between 1.0 and 2.0 ml per kg of $BSB_{5,zw}$. Three weeks after the start of the investigations, a 20% reduction was established at a dose of 1.0 ml/kg $BSB_{5,zw}$, and was constant for a further three weeks. Within one week, an increase or the dose to 1.5 ml/kg of $BSB_{5,zw}$ shows a strong reduction of residue production to 50%, which also remained constant in the following three weeks. With another increase to 2.0 ml/kg of $BSB_{5,zw}$, the reduction was increased by 5 to 55% and remained constant until the end of the investigation period. Within a period of 14 weeks, the action of the substance mixture and the influence of the addition in small quantities on this large-scale system were clearly demonstrated.

TABLE 2

| | Doses | | | |
|---|---|---|---|---|
| | mg/kg $BSB_{5,zw}$ | | mg/kg TS per day | |
| | W. carbo-hydrates | Vitamins | W. carbo-hydrates | Vitamins |
| Wide | 0.04-600 | 0.00046-6.9 | 0.0014-14 | 0.000016-0.16 |
| Medium | 0.4-600 | 0.0046-6.9 | 0.014-14 | 0.00016-0.16 |
| Narrow | 4-200 | 0.046-2.3 | 0.14-5 | 0.0016-0.06 |

The invention claimed is:

1. Method for biological treatment of water in a biological water treatment system, characterized in that macromolecular carbohydrates at a quantity of 0.0014 to 14 mg/kg of dry activated sludge per day, are added to the water prior to treatment or during treatment in the biological water treatment system, wherein said macromolecular carbohydrates include sodium alginate.

2. Method according to claim 1, characterized in that macromolecular carbohydrates and vitamins at a quantity of 0.0014 to 14 mg of macromolecular carbohydrates /kg of dry activated sludge per day plus 0.000016 to 0.16 mg of vitamins/kg of dry activated sludge per day are added to the water prior to treatment or during treatment in the biological water treatment system.

3. Method according to claim 2 wherein said vitamins are selected from the group consisting of biotin, thiamine hydrochloride, pyridoxine hydrochloride, and aminobenzoic acid or mixtures of these substances.

4. Method according to claim 1, wherein at least one of electrolyte salts, polyvalent alcohols, salts of organic acids, low-molecular aminocarbon acids, macropeptides and aromas or mixtures of these materials are added to said water prior to treatment or during treatment in the biological water treatment system.

5. Method according to claim 4, characterized in that at least one of
inorganic metal salts are used as electrolyte salts,
glycine is used as a low-molecular aminocarbon acid,
trisodium citrate dihydrate is used as a salt or organic acid,
sorbite-mannite mixtures are used as polyvalent alcohols,
bovine serum albumin is used as macropeptides, and
pineapple aroma is used as aroma.

6. Method according to claim 1, characterized in that said macromolecular carbohydrates or a mixture including said macromolecular carbohydrates and other substances is added to said water in solid, liquid, dissolved or dispersed form, or as an aqueous solution or dispersion.

7. Method according to claim 6, characterized in that said aqueous solution or dispersion contains 1 to 100 g/l of said macromolecular carbohydrates.

8. Method according to claim 6, wherein said other substances in said mixture include vitamins and wherein said aqueous solution or dispersion contains 0.002 to 20 g/l of vitamins.

9. Method according to claim 5, characterized in that a solution or dispersion containing said electrolyte salts, said polyvalent alcohols, said salts or organic acids, said low-molecular aminocarbon acids, said macropeptides, said aromas or mixtures of these substances is added at a concentration of 0.1 to 500 g/l.

10. Method according to claim 1, characterized in that a sludge dwell time is set at 30 to 300 days.

11. Method according to claim 1 wherein said macromolecular carbohydrates are added at a quantity of 0.14 to 5 mg/kg per day of dry activated sludge per day.

12. Method according to claim 2 wherein said macromolecular carbohydrates and vitamins are at a quantity of 0.14 to 5 mg of macromolecular carbohydrates/kg of dry activated sludge per day plus 0.0016 to 0.06 mg of vitamins/kg of dry activated sludge per day.

13. Method according to claim 5 wherein said inorganic metal salts are chlorides.

14. Method according to claim 7 wherein said aqueous solution or dispersion contains 5 to 30 g/l of said macromolecular carbohydrates.

15. Method according to claim 8 wherein said aqueous solution or dispersion contains 0.02 to 2/l of vitamins.

16. Method according to claim 4, characterized in that a solution or dispersion containing said electrolyte salts, said polyvalent alcohols, said salts or organic acids, said low-molecular aminocarbon acids, said macropeptides, said aromas or mixtures of these substances is added at a concentration of 1 to 50 g/l.

17. Method according to claim 1, characterized in that a sludge dwell time is set at 100 to 300 days.

18. A method for biological treatment of water in a biological water treatment system, characterized in that macromolecular carbohydrates at a quantity of 0.0014 to 14 mg/kg of dry activated sludge per day, are added to the water prior to treatment or during treatment in the biological water treatment system,
wherein at least one of electrolyte salts, polyvalent alcohols, salts of organic acids, low-molecular aminocarbon acids, macropeptides and aromas or mixtures of these materials are added to said water prior to treatment or during treatment in the biological water treatment system,
and wherein at least one of
inorganic metal salts are used as electrolyte salts,
glycine is used as a low-molecular aminocarbon acid,
trisodium citrate dihydrate is used as a salt or organic acid,
sorbite-mannite mixtures are used as polyvalent alcohols,
bovine serum albumin is used as macropeptides, and
pineapple aroma is used as aroma.

19. The method according to claim 18, characterized in that a solution or dispersion containing said electrolyte salts, said polyvalent alcohols, said salts or organic acids, said low-molecular aminocarbon acids, said macropeptides, said aromas or mixtures of these substances is added at a concentration of 0.1 to 500 g/l.

20. The method according to claim 18 wherein said inorganic metal salts are chlorides.

* * * * *